(12) United States Patent
Milde et al.

(10) Patent No.: US 12,649,187 B2
(45) Date of Patent: Jun. 9, 2026

(54) DEVICE FOR ADDITIVE MANUFACTURING OF A WORKPIECE

(71) Applicant: Carl Zeiss Industrielle Messtechnik GmbH, Oberkochen (DE)

(72) Inventors: Thomas Milde, Nausnitz (DE); Frank Widulle, Neu-Ulm (DE); Michael Totzeck, Schwaebisch Gmuend (DE); Christian Platt, Ulm (DE); Johann Irnstetter, Heidenheim an der Brenz (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 778 days.

(21) Appl. No.: 18/054,855

(22) Filed: Nov. 11, 2022

(65) Prior Publication Data

US 2023/0070819 A1    Mar. 9, 2023

Related U.S. Application Data

(63) Continuation of application No. PCT/EP2020/063010, filed on May 11, 2020.

(51) Int. Cl.
*B22F 12/90* (2021.01)
*B22F 10/366* (2021.01)
(Continued)

(52) U.S. Cl.
CPC ............ *B22F 12/90* (2021.01); *B22F 10/366* (2021.01); *B22F 10/85* (2021.01); *B22F 12/30* (2021.01);
(Continued)

(58) Field of Classification Search
None
See application file for complete search history.

(56) References Cited

U.S. PATENT DOCUMENTS

| | | | |
|---|---|---|---|
| 6,309,809 B1 | 10/2001 | Starikov | |
| 6,483,596 B1 | 11/2002 | Philippi | |

(Continued)

FOREIGN PATENT DOCUMENTS

| | | |
|---|---|---|
| DE | 10101057 A1 | 6/2002 |
| DE | 10314461 A1 | 11/2003 |

(Continued)

OTHER PUBLICATIONS

Sarah K. Everton et al., "Review of in-situ process monitoring and in-situ metrology for metal additive manufacturing," Materials and Design 95 (2016) p. 431-445, Published by Elsevier Ltd.; https://www.sciencedirect. com/science/article/pii/S0264127516300995.

(Continued)

*Primary Examiner* — Thor S Campbell
(74) *Attorney, Agent, or Firm* — Miller Johnson

(57) ABSTRACT

A device for additive manufacturing of a workpiece includes a production platform supporting a defined material layer of particulate material, a structuring tool, an inspection sensor, a control unit, and a position encoder. The inspection sensor has a line scan camera and a line light source and is movable along a movement direction relative to the production platform. The position encoder generates a position signal representing a respective instantaneous position of the inspection sensor relative to the production platform. The control unit generates a spatially resolved image of the defined layer using the line light source, the line scan camera, and the position signal. The control unit controls the structuring tool in order to produce a defined workpiece layer by selectively solidifying particulate material of the defined material layer based on the image of the defined material layer and/or an image of a previously produced workpiece layer.

15 Claims, 5 Drawing Sheets

(51) Int. Cl.
| | |
|---|---|
| *B22F 10/85* | (2021.01) |
| *B22F 12/30* | (2021.01) |
| *B22F 12/45* | (2021.01) |
| *B22F 12/50* | (2021.01) |
| *B33Y 30/00* | (2015.01) |

(52) U.S. Cl.
CPC ............. *B22F 12/45* (2021.01); *B22F 12/50* (2021.01); *B33Y 30/00* (2014.12)

(56) References Cited

U.S. PATENT DOCUMENTS

| | | | |
|---|---|---|---|
| 6,930,278 | B1 | 8/2005 | Chung |
| 7,043,330 | B2 | 5/2006 | Toyserkani |
| 7,278,315 | B1 | 10/2007 | Klein |
| 8,514,389 | B2 | 8/2013 | Aoki |
| 8,666,142 | B2 | 3/2014 | Shkolnik |
| 8,778,252 | B2 | 7/2014 | Mackie |
| 8,804,102 | B2 | 8/2014 | Green |
| 9,205,690 | B2 | 12/2015 | Leavitt |
| 9,457,428 | B2 * | 10/2016 | Webster ............... B23K 9/0956 |
| 9,527,272 | B2 | 12/2016 | Steele |
| 9,936,995 | B2 | 4/2018 | Dacosta |
| 10,157,500 | B2 * | 12/2018 | Gritzky .................. A61B 8/466 |
| 10,220,566 | B2 | 3/2019 | Bauza |
| 11,105,754 | B2 * | 8/2021 | Yacoubian ............. B22F 12/90 |
| 11,249,029 | B2 * | 2/2022 | Hu ..................... G01N 21/8806 |
| 12,253,353 | B2 * | 3/2025 | Yacoubian .......... G01B 11/254 |
| 2005/0248065 | A1 | 11/2005 | Owada |
| 2007/0228592 | A1 | 10/2007 | Dunn |
| 2009/0024243 | A1 | 1/2009 | Suh |
| 2009/0248355 | A1 | 10/2009 | Kriegmair |
| 2010/0125356 | A1 | 5/2010 | Shkolnik |
| 2011/0061591 | A1 | 3/2011 | Stecker |
| 2011/0130854 | A1 | 6/2011 | Lettenbauer |
| 2013/0015596 | A1 | 1/2013 | Mozeika |
| 2013/0078821 | A1 | 3/2013 | Furutono |
| 2013/0178952 | A1 | 7/2013 | Wersborg |
| 2013/0189435 | A1 | 7/2013 | Mackie |
| 2014/0107823 | A1 | 4/2014 | Huang |
| 2014/0271961 | A1 | 9/2014 | Khoshnevis |
| 2014/0271964 | A1 * | 9/2014 | Roberts, IV .......... B29C 64/393 |
| | | | 425/150 |
| 2015/0045928 | A1 | 2/2015 | Perez |
| 2015/0140147 | A1 | 5/2015 | Konstantinos |
| 2015/0165681 | A1 | 6/2015 | Fish |
| 2015/0174828 | A1 | 6/2015 | Creuzer |
| 2015/0268099 | A1 * | 9/2015 | Craig ..................... B33Y 10/00 |
| | | | 374/130 |
| 2015/0375456 | A1 | 12/2015 | Cheverton |
| 2016/0193790 | A1 | 7/2016 | Shuck |
| 2017/0059529 | A1 | 3/2017 | Kamel |
| 2019/0009369 | A1 * | 1/2019 | Vorontsov .......... B23K 26/0876 |
| 2019/0039318 | A1 | 2/2019 | Madigan |
| 2019/0107497 | A1 * | 4/2019 | Lindner ................. G01N 21/93 |
| 2019/0195626 | A1 * | 6/2019 | Iseli ...................... G06F 18/251 |
| 2020/0110025 | A1 * | 4/2020 | Yacoubian ......... G01N 21/4788 |
| 2020/0158499 | A1 | 5/2020 | Stoppe |
| 2020/0223146 | A1 | 7/2020 | Totzeck |
| 2020/0238625 | A1 * | 7/2020 | Champion ............. B29C 64/10 |
| 2023/0104090 | A1 * | 4/2023 | Löfving ................. B22F 10/85 |
| | | | 264/497 |

FOREIGN PATENT DOCUMENTS

| | | | |
|---|---|---|---|
| DE | 102008016026 A1 | 10/2009 | |
| DE | 102008034117 A1 | 2/2010 | |
| DE | 102015110264 A1 | 12/2016 | |
| DE | 102016115241 A1 | 3/2017 | |
| DE | 102015223474 A1 | 6/2017 | |
| DE | 102015224395 A1 | 6/2017 | |
| DE | 102016209065 A1 | 11/2017 | |
| DE | 102016110266 A1 | 12/2017 | |
| DE | 102018127754 A1 | 5/2020 | |
| DE | 102019004342 A1 | 12/2020 | |
| EP | 1815936 B1 | 11/2009 | |
| EP | 2313867 B2 | 11/2011 | |
| WO | 2018197389 A1 | 1/2018 | |
| WO | 2018234331 A1 | 12/2018 | |
| WO | 2019028184 A1 | 2/2019 | |

OTHER PUBLICATIONS

Scott Betts et al., "The relationship between In-Process Quality Metrics & Computational Tomography," Sigma Labs, Inc. <http://sigmalabsinc.com/wp-content/uploads/2019/02/TEP-CT-correlation-Sigma-Labs- Quality-Assurance.pdf>.

Will Dalrymple, "Pooling information," Machinery Magazine, Published Aug. 2015 <http://www.machinery.co.uk/machinery-features/ concept-laser-is-promising-additive-manufacturing-users-a-more-comprehensive-part-propertyanalysis- tool>.

Volker Carl, "Monitoring system for the quality assessment in Additive Manufacturing," carl@t-zfp.de <http://www.impulsthermografie.de/QNDE2014-Proceeding_EN_V3.pdf>.

Trumpf, "Deposition welding, Building shapes our of powder and wire," Retrieved from the internet on Dec. 2, 2021 <https://www.trumpf.com/en_US/solutions/applications/laser-welding/deposition-welding/>.

Econolyst, "Direct Rapid Manufacturing of Metallic Parts—A UK Industry overview," Enconolyst Ltd, Wirksworth, Derbyshire, UK, Feb. 2008.

RJ Dewhurst et al., "Optical remote measurement of ultrasound," Meas. Sci. Technol. 10 (1999) R139-R168, Published Jul. 15, 1999.

Miguel Avervallilo Herraez et al., "Fast two-dimensional phase-unwrapping algorithm based on sorting by reliability following a noncontinuous path," Applied Optics, vol. 41, No. 35, Published Dec. 10, 2002, Optical Society of America.

Lawrence Livermore National Laboratory, "Real-time Melt Pool Sensor," Retrieved from the internet on May 6, 2019, <https://manufacturing.llnl.gov/additive-manufacturing/accelerated-certification/real-time-melt-pool-sensor>.

G. Zenzinger et al., "Online-Prozesskontrolle bei der additiven Fertigung mittels Laserstrahlschmelzen," NDT Journal, Technical papers from ZfP Zeitung, Jun. 2014.

Mitsuo Takeda et al., "Fourier-transform method of fringe-pattern analysis for computer-based topography and interferometry," Journal of the Optical Society of America vol. 72, p. 156ff (1982); https://www.osapublishing. org/josa/abstract.cfm?uri=josa-72-1-156.

* cited by examiner

DEVICE FOR ADDITIVE MANUFACTURING OF A WORKPIECE

CROSS-REFERENCE TO RELATED APPLICATIONS

This application is a continuation of international patent application PCT/EP2020/063010, filed on May 11, 2020, the entire disclosure of which is incorporated by reference.

FIELD

The present disclosure relates to a device for additive manufacturing of a workpiece, and more particularly to an additive manufacturing device having an inspection sensor for inspecting a material layer prior to producing a defined workpiece layer and/or for inspecting a workpiece layer during the production process.

BACKGROUND

Additive methods for manufacturing of workpieces are sometimes referred to as 3D printing. There are various additive manufacturing methods. So-called selective laser sintering (SLS) and selective laser melting (SLM) make use of a powder bed comprising a plurality of (often metallic) powder particles, by way for example. Selected powder particles in the powder bed are sintered or melted using an energy beam, such as a laser beam, and a desired material structure is thus manufactured from the powder bed layer by layer.

In the individual workpiece layers and between successive workpiece layers, undesired anomalies that adversely influence the quality of the workpiece may occur during the production process. The anomalies may include e.g. pores, cracks, unmelted material, drop formation, layer detachments, etc. For this reason, it is desirable to monitor the layer formation in the production process and, if appropriate, to take corrective measures in the ongoing production process in order to minimize undesired anomalies and defects resulting therefrom. Particularly when metallic materials are used, numerous reflections caused by the metallic powder particles can make inspection difficult. Cast shadows are another difficulty. Moreover, it is difficult to integrate the components of a suitable inspection sensor into the confined structural space of a production platform.

By way of example, U.S. Pat. No. 10,220,566 B2 proposes to arrange an optical measurement sensor on the so-called doctor blade. The doctor blade is a layer forming tool that serves to produce a defined material layer from the particulate material, the layer having a surface that is as homogeneous and smooth as possible. The doctor blade may have a blade-like edge that distributes and smooths the particulate material on the production platform.

EP 1 815 936 B1 describes a method for the additive manufacturing of a workpiece using a first laser beam, which selectively solidifies the particulate material on the production platform. Using a second laser beam, an inspection sensor excites an ultrasonic wave pattern in the respective upper workpiece layer. The ultrasonic waves interact with the anomalies and produce interference patterns that can be determined on the basis of echo responses from the layer surface. EP 1 815 936 B1 mentions very generally that the inspection sensor may be integrated into the layer forming tool, but without explaining any details.

The publication "Review of in-situ process monitoring and in-situ metrology for metal additive manufacturing" by Sarah K. Everton et al. in Materials and Design 95 (2016), pages 431 to 445, gives an overview of inspection methods for the additive manufacturing of a workpiece. According to one proposal, what is known as the melt pool, that is to say the material region melted with the laser beam, is recorded with an 2D camera, and the temperature averaged over the melt pool is determined. The data obtained can be used to monitor the manufacturing process, but they do not provide any direct information on quality-relevant anomalies, some of which only arise after the melt pool has solidified.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Against this background, it is an object of the present invention to provide a device for the additive manufacturing of workpieces in which the quality of the material and workpiece layers can be closely monitored.

It is another object to provide a device for the additive manufacturing of workpieces in which the quality of the material and workpiece layers can be efficiently monitored.

It is yet another object to provide a device for the additive manufacturing of workpieces comprising an inspection sensor which can recognize as many types of anomalies and defects as possible.

It is yet another object to integrate an inspection sensor for detecting anomalies and defects during additive manufacturing into an additive manufacturing device in a cost efficient manner.

In accordance with one aspect of the invention, there is provided a device for the additive manufacturing of a workpiece, comprising a production platform configured to support a defined material layer of particulate material, comprising a structuring tool configured to selectively solidify particulate material of the defined material layer supported on the production platform in order to produce a defined workpiece layer, comprising an inspection sensor configured to inspect at least one of the defined material layer or the defined workpiece layer, the inspection sensor comprising at least one line scan camera and at least one line light source, comprising an evaluation and control unit having an interface configured to obtain a data set defining the workpiece in a plurality of successive workpiece layers one on top of another, and comprising a position encoder, wherein the evaluation and control unit is configured to control the structuring tool depending on the data set in order to produce the plurality of successive workpiece layers one on top of another from the particulate material, wherein the inspection sensor is movable along a movement direction relative to the production platform, wherein the at least one line scan camera and the at least one line light source each extend transversely with respect to the movement direction, wherein the inspection sensor is coupled to the position encoder such that the position encoder generates a position signal representing a respective instantaneous position of the inspection sensor relative to the production platform, wherein the evaluation and control unit is further configured to generate a spatially resolved image of the at least one of the defined material layer or the defined workpiece layer using the at least one line light source, the at least one line scan camera and the position signal, and wherein the evaluation and control unit is further configured to control the structuring tool depending on the spatially resolved image.

The novel device thus uses at least one line scan camera and utilizes the movement of the line scan camera relative to the production platform in order to record a spatially resolved image of a defined material layer composed of the particulate material and/or of a workpiece layer manufactured therefrom. In some embodiments, the device can have a plurality of line scan cameras and/or a multi-line scan camera in order to record a plurality of spatially resolved images exploiting a movement along the movement direction. The use of one or more line scan cameras makes it possible to mount the inspection sensor in a manner that is very space-saving and close to the process in the region of the production platform. On account of the movement relative to the production platform, a bulky optical unit having a wide field of view can advantageously be dispensed with. Furthermore, such a line scan camera can be positioned at a small distance from the defined material layer and/or workpiece layer, which facilitates a "free view" onto the aforementioned layers for the inspection sensor.

Furthermore, the inspection sensor of the novel device has at least one line light source configured to illuminate the defined material layer or workpiece layer in the recording region of the line scan camera. In some embodiments, the line scan camera and the line light source are arranged parallel to one another. The integration of the line light source into the inspection sensor movable relative to the production platform facilitates shading-free illumination of the defined material layer or workpiece layer during image recording. Moreover, the moved line light source enables an illumination of the defined material layer or workpiece layer from different directions to be achieved in a simple and cost-effective manner. Finally, the heat input of the illumination into the defined material layer or workpiece layer can be minimized using such a line light source.

The line scan camera and line light source moved relative to the production platform enable image recording with high image quality. In particular, it is possible to minimize disturbing reflections and striations owing to process gases on account of the spatial proximity of the inspection sensor to the defined material layer or workpiece layer. The integration of the line light source into the moved inspection sensor thus enables a targeted illumination in proximity to the process from different directions.

Overall, the inspection sensor of the novel device can therefore be integrated into the work area of the structuring tool very cost-effectively and compactly for monitoring in proximity to the process. In various implementations, the novel device enables the defined material layer to be monitored before the selective solidification and enables the defined workpiece layer to be inspected after the selective solidification with adapted illumination in each case.

In various refinements, the device has a layer forming tool, such as in particular a doctor blade, configured to form the defined material layer composed of the particulate material on the production platform, wherein the layer forming tool is movable relative to the production platform along the movement direction, and wherein the inspection sensor is arranged on the layer forming tool. In other refinements, the inspection sensor can be arranged on a connecting piece or slide that is movable relative to the production platform and is present in addition to the layer forming tool.

In various implementations, an inspection sensor on the layer forming tool enables a particularly compact and cost-effective realization. As an alternative thereto, an arrangement of the inspection sensor on a separate connecting piece or slide facilitates monitoring of the writing process with the structuring tool in proximity to the process. In some embodiments, the melt pool can be monitored with the aid of the line scan camera, i.e. the respective locally melted region of the defined material layer. In particular, the shape and/or dimensions of the melt pool can be measured with the aid of the inspection sensor.

In a further refinement, the layer forming tool has a material outlet for discharging the particulate material, and the inspection sensor has a first line scan camera and a second line scan camera, wherein the first line scan camera is arranged upstream of the material outlet in the movement direction, and wherein the second line scan camera is arranged downstream of the material outlet in the movement direction.

In some embodiments of this refinement, the layer forming tool can include a co-running reservoir, from which the particulate material is discharged through the material outlet onto the production platform or a previously manufactured workpiece layer. Using the second line scan camera, it is possible to monitor the homogeneity of the defined material layer before the selective solidification in proximity to the process. In some embodiments, the defined material layer can be reworked with the aid of the layer forming tool in a control loop if inhomogeneities of the material layer are recognized with the aid of the line scan camera trailing in the movement direction. By way of example, material accumulations or depressions in the defined material layer owing to material defects or damage to the layer forming tool can be recognized in proximity to the process. With the aid of the line scan camera leading in the movement direction, by contrast, a previously solidified workpiece layer can be inspected. This can advantageously be done at the same time as the discharge of the particulate material for the next material layer.

In a further refinement, the line light source has a plurality of light elements, wherein the evaluation and control unit is configured to selectively activate or deactivate the plurality of light elements in order to produce an illumination of the defined material layer and/or workpiece layer from different directions. In various embodiments of this refinement, a plurality of images of the defined material layer and/or workpiece layer are recorded with the aid of the line scan camera, wherein the individual images show the material layer and/or workpiece layer in each case with a different illumination, for example from a different direction in each case. In particular, this refinement enables an angle-selective illumination of the material layer and/or workpiece layer for recording a plurality of angle-selectively illuminated images. The refinement enables a very advantageous correction of shadows and light reflections on the basis of the plurality of images, as is described further below for one embodiment. Furthermore, a spatial distribution of light reflections at the defined material layer can be determined in a very simple manner, which facilitates an inspection of the material layer in regard to the homogeneity of the particulate material. Moreover, the defined material layer and/or workpiece layer can be inspected by deflectometry with the aid of the angle-selective illumination. The refinement therefore enables a plurality of advantageous methods for inspecting the material layer and/or workpiece layer with the aid of a cost-effective implementation.

In a further refinement, the inspection sensor has at least two line light sources, wherein a first line light source of the at least two line light sources is arranged upstream of the line scan camera in the movement direction, and wherein a second line light source of the at least two line light sources is arranged near the line scan camera in the movement direction.

This refinement makes it possible to illuminate the surface to be inspected of the material layer and/or workpiece layer from opposite directions relative to the movement direction of the inspection sensor. Accordingly, this refinement also enables the recording of a plurality of images with a different illumination in each case, and also an evaluation of the images on the basis thereof.

In a further refinement, the line light source has a plurality of light elements having mutually different light colors. By way of example, the line light source can have, in the movement direction and/or transversely with respect thereto, a sequence of red, green and blue LEDs and/or a sequence of light elements which emit light alternately in the visible spectral range or in the non-visible infrared range (relative to the dominant spectral color in each case). In various embodiments, the line scan camera has a plurality of camera elements (pixels), each of which is sensitive to one of the different spectral colors. The refinement enables an angle-selective illumination encoded by way of the spectral colors of the emitted light. In various embodiments, the angle-selectively illuminated images can therefore be recorded synchronously with one another, which enables a very fast inspection of the defined material layer and/or workpiece layer. Furthermore, infrared images and/or optical images of the defined material layer and/or workpiece layer can optionally be recorded, which enables the material layer and/or workpiece layer to be inspected flexibly and in proximity to the process.

In a further refinement, the inspection sensor has a first line scan camera and a second line scan camera, wherein the first line scan camera has a first optical axis running orthogonally with respect to the defined material layer, and wherein the second line scan camera has a second optical axis running obliquely with respect to the defined material layer.

This refinement enables the recording of images from different viewing directions toward the material layer and/or workpiece layer. In various embodiments, the images can be recorded simultaneously from the different viewing directions. The refinement contributes to increasing the information density and to enabling the material layer and/or workpiece layer to be inspected flexibly in proximity to the process.

In a further refinement, the first optical axis and the second optical axis intersect at the defined workpiece layer.

In this refinement, the first line scan camera and the second line scan camera each record the same portion from the material layer and/or workpiece layer during the movement of the inspection sensor. The refinement facilitates a correlation of the recorded images and enables a particularly accurately detailed inspection of the material layer and/or workpiece layer.

In a further refinement, the first line scan camera is configured to generate a spatially resolved thermal image of the defined workpiece layer. In some embodiments, the first line scan camera can include a bandpass filter that predominantly transmits radiation in the near infrared range (NIR bandpass filter). In further embodiments, the first line scan camera can include an infrared line scan camera or a linear arrangement of pyrometers In some embodiments, the first line scan camera substantially captures thermal radiation. Accordingly, the spatially resolved image from the first line scan camera can be a thermal image showing the melt pool and/or the workpiece layer after the selective solidification. Such an image enables a correction in proximity to the process, which correction is advantageously effected in a closed control loop. In contrast thereto, in various embodiments, the second line scan camera is a camera which substantially captures radiation in the visible spectral range. Advantageously, the second line scan camera can therefore be used for an inspection of the defined material layer and/or workpiece layer according to the principle of deflectometry. By way of example, with the aid of the second line scan camera, local height variations on the surface of the defined material layer and/or workpiece layer can be recognized in proximity to the process and efficiently.

In a further refinement, the evaluation and control unit is configured to correlate with one another a first image captured by the first line scan camera and a second image captured by the second line scan camera.

This refinement enables a very accurately detailed inspection of a material layer and/or workpiece layer by way of the fusion of different sensor data here. In various embodiments, the evaluation and control unit is configured to correlate with one another contrast structures, i.e. structures manifested on the basis of contrasts in the images respectively recorded. Advantageously, for example, contrast structures in a spatially resolved image of the defined material layer can be correlated with contrast structures in a spatially resolved image of the workpiece layer in order to track the arising of defects in the workpiece layer in proximity to the process.

In a further refinement, the line light source is oriented obliquely with respect to the defined workpiece layer. In some embodiments, the line light source is oriented axially symmetrically with respect to the second line scan camera, the axis of symmetry being parallel and in particular coaxial with respect to the optical axis of the first line scan camera.

The refinement is particularly advantageous in order to inspect the material layer and/or workpiece layer by deflectometry and/or on the basis of reflections of the light from the line light source.

In a further refinement, the line scan camera is a multi-line scan camera having a plurality of adjacent camera elements in the movement direction.

The refinement enables a rapid recording of a plurality of images and, in particular, a spatially resolved capture of transient signals in the defined material layer and/or workpiece layer since each region of the layer surface is captured repeatedly in the course of the movement. The refinement enables the recording of thermal images, for example, in which the propagation of a thermal excitation is discernible. Pores or other anomalies beneath the surface of the workpiece layer can thus be recognized in an efficient manner.

In a further refinement, the device has a pattern generator arranged above the production platform.

A pattern generator within the meaning of this refinement is a display or a projector, which generate a defined bright-dark pattern in such a way that the latter is visible on or over the surface of the material layer and/or workpiece layer. The refinement enables a layer surface to be inspected in proximity to the process according to the principle of deflectometry, in particular according to the principle of phase shifting deflectometry. In various embodiments, the pattern generator is configured to generate a variable bright and dark pattern, such as a stripe pattern, for instance, which can be displaced relative to the layer surface being inspected.

It goes without saying that the aforementioned features and those yet to be explained below can be used not only in the combination specified in each case but also in other combinations or on their own, without departing from the scope of the present invention.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
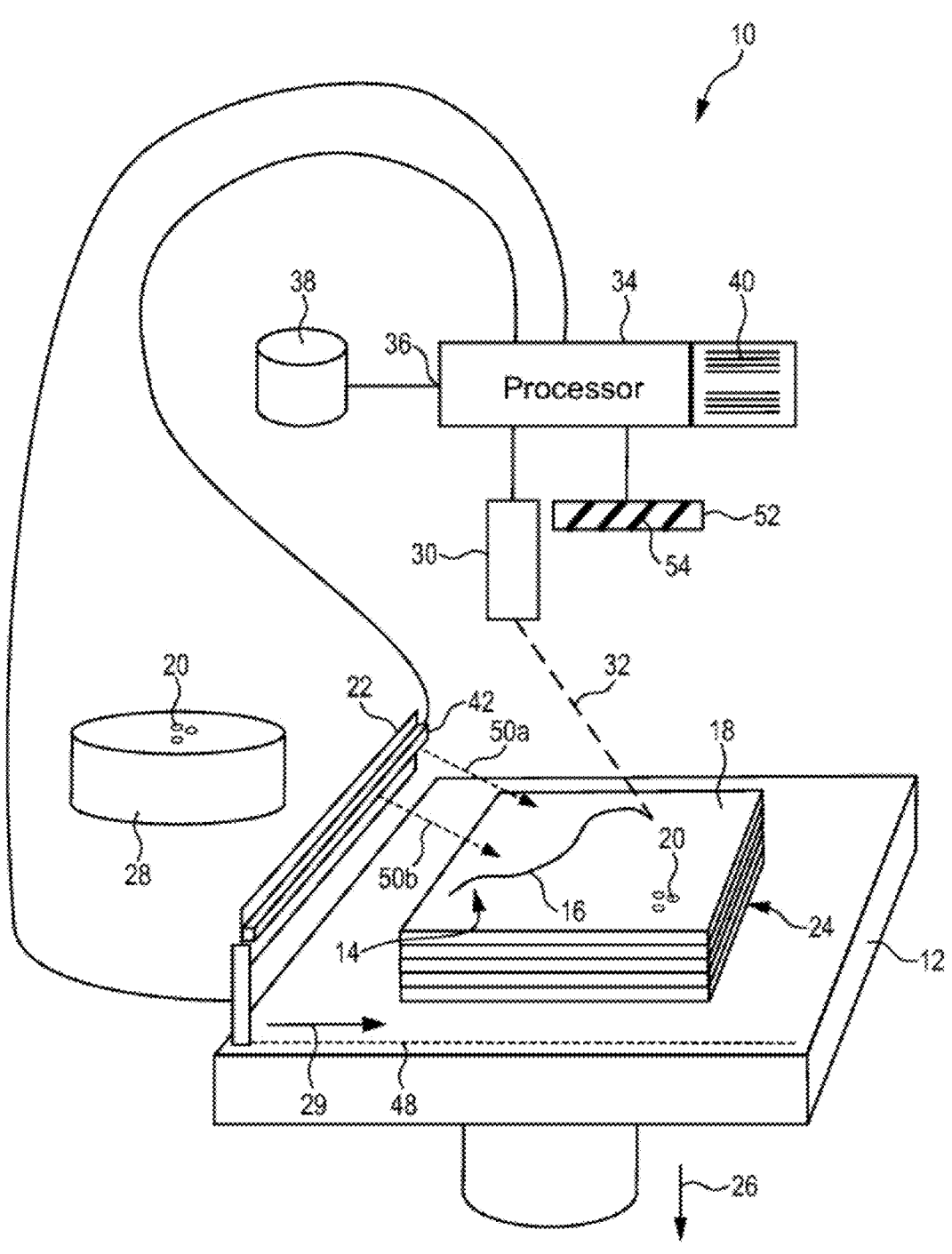
FIG. 1 shows a schematic illustration of an example embodiment of the novel device.

In FIG. 1, an example embodiment of the novel device is designated in its entirety by the reference numeral 10. The device 10 has a production platform 12, on which a workpiece 14 is additively manufactured. The workpiece 14 is built up from a material stack layer by layer from the bottom to the top in temporally successive steps. A currently topmost workpiece contour or workpiece layer is designated by the reference numeral 16. A topmost material layer from which the workpiece layer 16 is produced is designated by the reference numeral 18.

After a respective workpiece layer 16 has been completed, a new material layer 18 composed of a pulverulent material 20, for instance a metallic, plastics and/or ceramic material, is distributed on the layer stack 24 with the aid of a layer forming tool in the form of a doctor blade 22. For this purpose, the production platform 12 is typically lowered by the height of the next material layer in the direction of the arrow 26 and the particulate material 20 is taken from a reservoir 28 and distributed on the present layer stack 24 with the aid of the doctor blade 22. For this purpose, the doctor blade can be moved relative to the production platform 12 in the direction of the arrow 29. Other example embodiments can include applying a workpiece material without a doctor blade, for instance a locally selective feed of a workpiece material 20 by means of a tool head (not illustrated here) which is movable relative to the production platform 12.

Designated by the reference numeral 30, a structuring tool is illustrated in a simplified manner. In some example embodiments, the structuring tool 30 generates a laser beam 32 and moves it relative to the production platform 12 and the material layer 18 to be structured. By means of the laser beam 32, the material particles are selectively melted or totally melted, such that they solidify upon cooling.

In other example embodiments, the structuring tool 30 can generate an electron beam in order to structure a workpiece layer 16 on the production platform 12. Furthermore, in further example embodiments, as an alternative or in addition to the energy beam 30, the structuring tool 30 could apply a workpiece material locally selectively on the production platform 12 or the topmost workpiece layer 16, for example in the form of a material powder that is introduced into a melt pool In some example embodiments, the device 10 can include more than one structuring tool 30, that is to say it can use for instance two or more laser and/or electron beams for producing a workpiece layer.

The structuring tool 30, sometimes simply referred to as a writing laser below, is connected to an evaluation and control unit 34, which controls the movement of the laser beam 32 along the material surface. The evaluation and control unit 34 has an interface 36, via which a data set 38 can be read in, which defines the workpiece 14 to be manufactured in a plurality of workpiece layers arranged one on top of another. Accordingly, the evaluation and control unit 34 controls the movement of the laser beam 32 depending on the data set 38, wherein the laser beam 32 describes a respective trajectory, which results from the data set 38, in each workpiece layer 16 to be manufactured. In some example embodiments, the evaluation and control unit 34 is realized with the aid of commercially available personal computers on which a commercially available operating system, such as, for instance, Microsoft Windows, OSX or Linux, and one or more control programs 40 are implemented. In some cases, the evaluation and control unit 34 can be realized as a soft PLC on a commercially available PC. Additionally or alternatively, the evaluation and control unit 34 can be realized with the aid of dedicated control hardware in the form of a PLC and/or with the aid of one or more ASICs, FPGAs, microcontrollers, microprocessors or comparable logic circuits. The evaluation and control unit 34 can be realized with the aid of a plurality of controllers and/or personal computers which are networked or communicate with one another in some other way, for instance via a dual-ported RAM (not illustrated here).

The device 10 furthermore has an inspection sensor 42 configured to inspect the surface of the layer stack 24. The inspection sensor 42 here includes one or more line scan cameras 44 and one or more line light sources 46 (see FIGS. 2, 4, 5, 6), which are each connected to the evaluation and control unit 34. As illustrated in FIG. 1, the inspection sensor 42 here is arranged on the doctor blade 22. The doctor blade 22 here is coupled to a position encoder 48. With the aid of the position encoder 48, the evaluation and control unit 34 can determine an instantaneous position of the doctor blade 22 relative to the production platform 12. Accordingly, the position encoder 48 generates a position signal that is representative of the respective instantaneous position of the inspection sensor 42 relative to the production platform 12 and thus also relative to the layer stack 24. The evaluation and control unit 34 can record a spatially resolved image of the surface of the layer stack 24 with the aid of the line scan camera 44 and using the position signal from the position encoder 48. Accordingly, the evaluation and control unit 34 can record spatially resolved images of the respective topmost material layer 18 and/or workpiece layer 16 with the aid of the line scan camera 44 and using the position signal.

The one or more line light sources extends transversely with respect to the movement direction 29. In example embodiments, the line light sources and line scan cameras extend over the entire width of the production platform. On account of the extent of the line light sources in a transverse direction and on account of the movement relative to the layer stack 24, the evaluation and control unit 34 is able to illuminate the upper material layer 18 comprising the particulate material and/or the upper workpiece layer 16 from a plurality of different directions. By way of example, two illumination directions are indicated here by the reference numerals 50a, 50b. In some variants, the one or more line scan cameras 44 can be configured to record a plurality of images of the surface of the layer stack 24 while the surface is illuminated from the different directions, i.e. angle-selectively. In addition to the arrangement illustrated in FIG. 1, the device 10 could furthermore have a ring light having a plurality of light sources that are drivable individually and/or in segments and/or a plurality of light sources around the production platform 12 in order to enable an illumination of the surface of the layer stack 24 from different directions.

In some example embodiments, the device 10 can include a pattern generator 52, which can generate a bright-dark pattern 54 above the layer stack 24. In some example embodiments, the pattern generator can furthermore be configured to illuminate the surface of the layer stack 24 from different directions. The pattern generator 52 can be a display, for instance an LED, LCD or OLED display, with the aid of which the evaluation and control unit 34 can generate variable patterns 54. In some example embodiments, the evaluation and control unit 34 can generate a stripe pattern 54 with the aid of the pattern generator 52, which stripe pattern is displaced in a plurality of steps relative to the surface of the layer stack 24 in order to enable an inspection of the material layer 18 and/or workpiece layer 16 according to the principle of phase shifting deflectometry. This method is inherently known to those skilled in the art for the inspection of reflective surfaces, for instance from WO 2009/083248 A1, which is incorporated by reference here referring to the explanations concerning the principle of phase shifting deflectometry.

Figure 2:
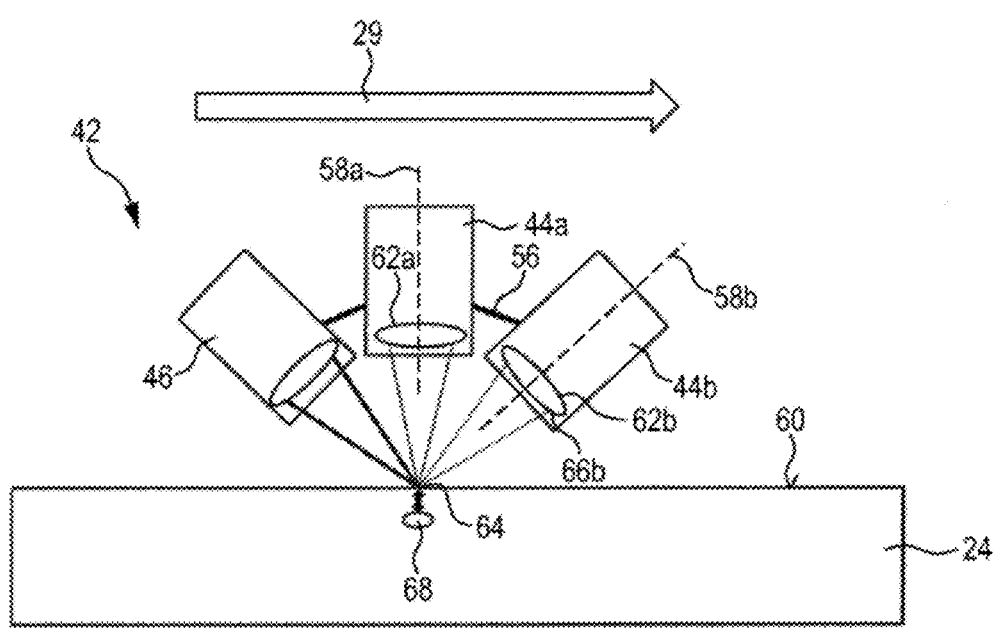
FIG. 2 shows a schematic illustration of an example embodiment of the inspection sensor of the device in accordance with FIG. 1.

FIG. 2 shows one example embodiment of an inspection sensor 42, which can be arranged on the doctor blade 22 or alternatively on a separate connecting piece (not illustrated here). Identical reference signs designate the same elements as before.

The inspection sensor in accordance with FIG. 2 has a first line scan camera 44a and a second line scan camera 44b and also a line light source 46, which are held stationary with respect to one another on a suitable carrier 56. The first line scan camera 44a has an optical axis 58a oriented substantially orthogonal with respect to the surface 60 of the layer stack 24. The optical axis 58a of the first line scan camera 44a thus also runs orthogonally relative to the respective topmost material layer 18 and workpiece layer 16. In some example embodiments, the first line scan camera 44a can include optical elements 62a, such as lens and/or mirror elements, for instance.

The second line scan camera 44b has a second optical axis 58b, which here is arranged obliquely with respect to the surface 60 of the layer stack 24. In various embodiments, the optical axes 58a, 58b intersect along a line which is indicated at the point 64 in FIG. 2 and which runs parallel to the longitudinal extent of the line scan cameras 44a, 44b on the surface 60 of the layer stack 24. In some example embodiments, the line scan camera 44b also has optical elements 62b. In some example embodiments, it is preferred if the line of intersection 64 of the optical axes 58a, 58b substantially corresponds to the respective focal line of the line scan cameras 44a, 44b. In other example embodiments, the line of intersection 64 of the optical axes 58a, 58b can be at a defined distance from the focal line of the line scan cameras 44a, 44b, which is advantageous in particular if the surface 60 of the layer stack 24 is inspected by deflectometry.

The inspection sensor 42 in accordance with FIG. 2 furthermore has a line light source 46, which generates a light line along the surface 60. In some example embodiments, the line light source 46 can be a laser light source, which generates a laser line on the surface 60. In various embodiments, the light line extends over the line of intersection 64 of the optical axes 58a, 58b. Furthermore, in this example embodiment, it is preferred for the line light source 46 and the second line scan camera 44b to be arranged approximately axially symmetrically with respect to the optical axis 58a of the first line scan camera 44a. In various embodiments, a light beam that is emitted by the line light source 46 and is reflected at the surface 60 in the region of the line of intersection 64 impinges on the second line scan camera 58b according to the principle of angle of incidence=angle of reflection. Accordingly, the second line scan camera 58b can be used here in order to inspect the defined material layer 18 and/or workpiece layer 16 on the basis of triangulation relationships between the line light source 46 and the line scan camera 44b. The second line scan camera 58b in these example embodiments may capture light from the visible spectral range. In some example embodiments, the second line scan camera 58b can have a bandpass filter 66b, the pass frequency of which is in the visible spectral range. Additionally or alternatively, the line scan cameras 44a and/or 44b can record a plurality of images of the defined material layer 18 and/or workpiece layer 16 in order, together with the pattern 54 from the pattern generator 52, to realize an inspection on the basis of phase shifting deflectometry.

In various embodiments, the first line scan camera 44a can be an infrared camera or a linear array of pyrometers. Advantageously, the first line scan camera 44a here captures thermal radiation from the surface 60. Accordingly, the first line scan camera 44a can be used in order to monitor the shape and/or dimensions of the melt pool, for example. Additionally or alternatively, the first line scan camera 44a can be used in order to capture transient temperature signals from the surface 60. By way of example, an anomaly or a defect 68 in workpiece layers near the surface can be detected with the aid of a spatially resolved thermal image.

In some example embodiments, the line light source 46 can generate light in the visible spectral range and in the infrared range, in particular in the near infrared range, in order to enable firstly a thermal inspection with the aid of the first line scan camera 44a and secondly a visual/deflectometric inspection with the aid of the second line scan camera 44b. By way of example, the line light source can therefore emit light from the spectral range between 350 nm and 3000 nm.

Figure 3:
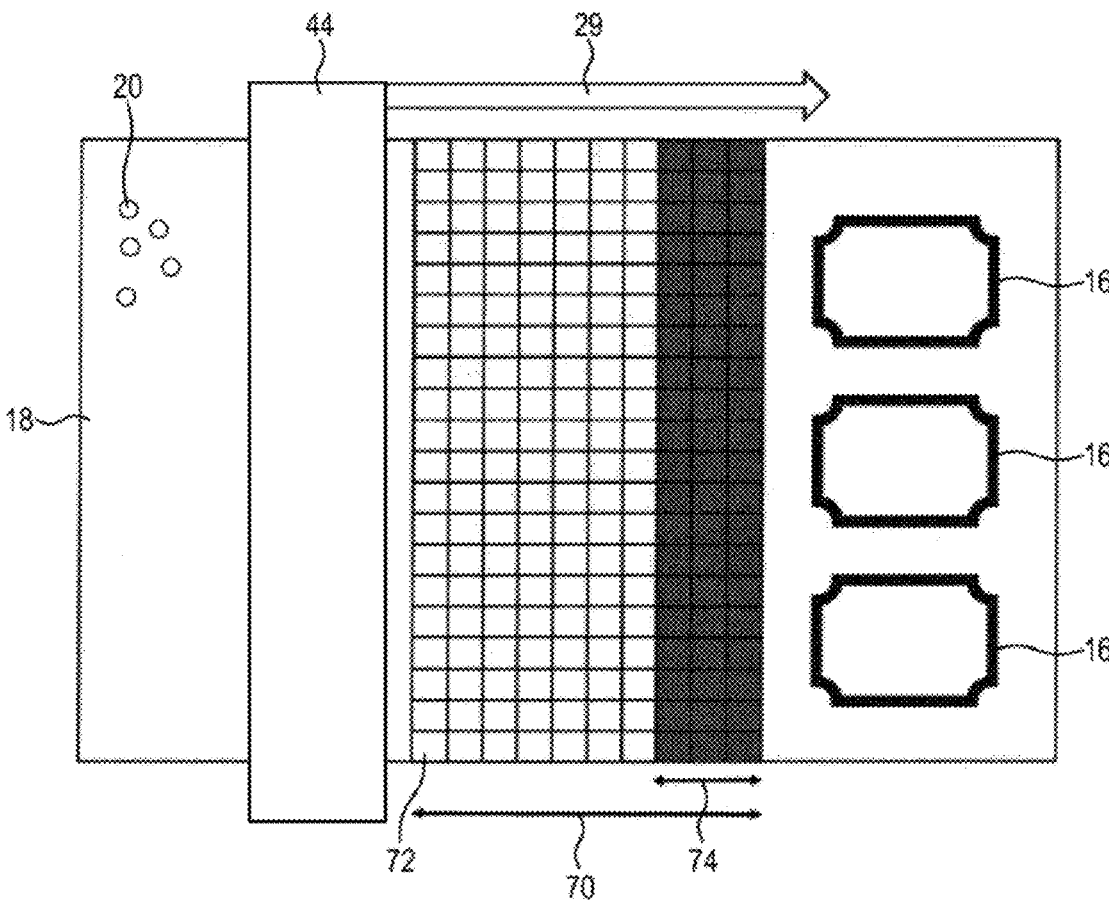
FIG. 3 shows a schematic illustration of a further example embodiment of the inspection sensor of the device in accordance with FIG. 1.

In various embodiments, the device 10 has one or more multi-line scan cameras. A multi-line scan camera in this sense is a line scan camera having a plurality of camera elements in the movement direction 29. FIG. 3 shows by way of example one such multi-line scan camera 44, which is moved relative to the production platform 12 over the defined material layer 18 in the direction of the arrow 29. The reference numeral 70 indicates a measurement region, here having a length of 10 camera elements/pixels, for example, in the movement direction 29. In other words, the multi-line scan camera 44 in this example embodiment has ten camera elements in the movement direction 29 and a plurality of camera elements transversely with respect thereto. In various embodiments, the line scan cameras 44a, 44b used or a line scan camera 44 used extend(s) transversely with respect to the movement direction 29 in each case over the entire production platform 12. In the movement direction 29, the one or more line scan cameras here each capture a limited portion of the defined material layer 18.

In the example embodiment in accordance with FIG. 3, it is possible to illuminate a small region 74 in the movement direction 29 with the aid of a line light source of the type mentioned above, while a larger measurement region 70 is captured with the aid of the line scan camera 44. In these example embodiments, it is possible to capture transient signals in the measurement region 70 owing to a thermal excitation in the region 74. With the aid of the position signal from the encoder 48, it is possible to determine a respective instantaneous position of the line scan camera 44 relative to the material surface 18 and it is thus possible to synchronously record a plurality of spatially resolved images of the material surface during a movement of the inspection sensor. Accordingly, a respective scan image can be recorded by each line of camera elements 72, the different scan images differing by virtue of a respective different distance from the illumination in the region 74.

Figure 4:
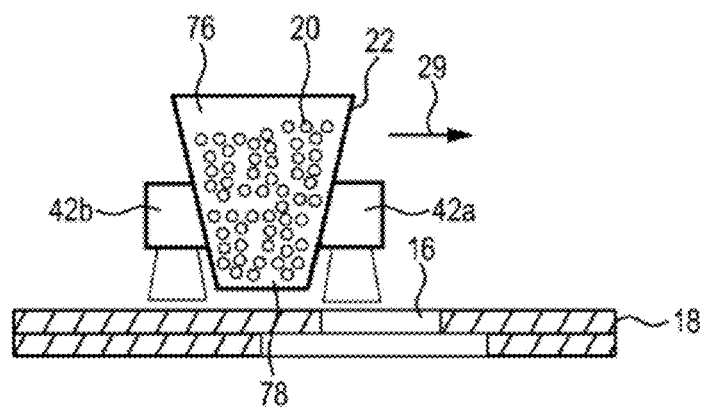
FIG. 4 shows a schematic illustration of a further example embodiment of the inspection sensor of the device in accordance with FIG. 1.

FIG. 4 shows a further example embodiment with an inspection sensor 42 arranged on a doctor blade 22. In this example embodiment, the doctor blade 22 has a reservoir 76 for receiving the particulate material 20 and also an outlet opening 78 for discharging the material 20. Furthermore, the inspection sensor has a first sensor part 42a and a second sensor part 42b. The sensor parts 42a, 42b can each include one or more line scan cameras and one or more line light sources (not illustrated separately here). In the example embodiment illustrated, the first sensor part 42a is arranged upstream of the material outlet 78 in the movement direction 29, while the second sensor part 42b is arranged downstream of the material outlet 78 in the movement direction 29. The second sensor part 42b can be used advantageously here in order to inspect a freshly produced powder layer. By contrast, the first sensor part 42a can be used advantageously in order to inspect a workpiece layer 16 produced last before a new powder layer is applied.

Figure 5:
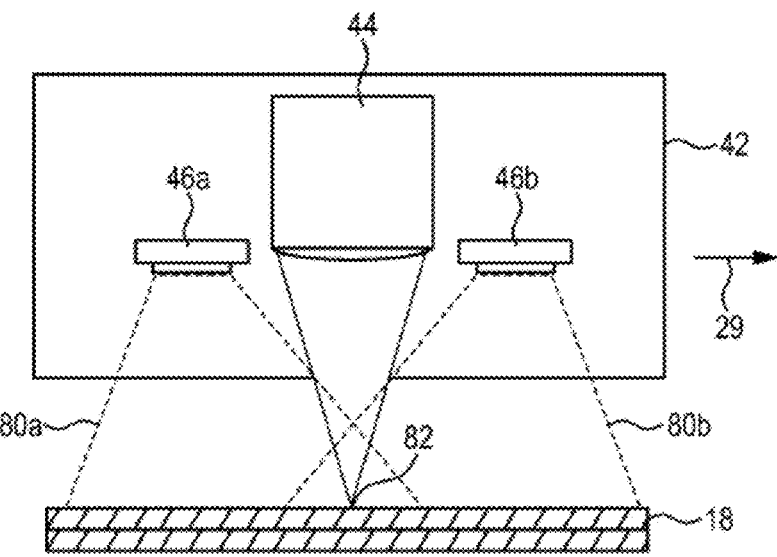
FIG. 5 shows a schematic illustration of a further example embodiment of the inspection sensor of the device in accordance with FIG. 1.

As illustrated in FIG. 5, in some example embodiments, the inspection sensor 42 can have a line scan camera 44 combined with a first line light source 46a and a second line light source 46b. In the example embodiment illustrated, the line scan camera 44 and the line light sources 46a, 46b each extend parallel to one another and, in various implementations, over the entire width of the production platform 12. In the movement direction 29, a line light source 46b leads the line scan camera 44, while a further line light source 46a trails behind the line scan camera 44. The line light sources 46a, 46b here have respective light cones 80a, 80b, which overlap in the region of the focal line 82 of the line scan camera 44. Accordingly, a region of the material layer 18 that is recorded by the line scan camera 44 can optionally be illuminated by the line light source 46a and/or by the line light source 46b. In particular, in these example embodiments, it is also possible for a region of the material layer 18 that is captured by the line scan camera 44 to be illuminated from opposite directions. A method for inspecting the defined material layer can advantageously be implemented in this way, as described below for one various embodiments with reference to FIGS. 7 and 8.

Figure 6:
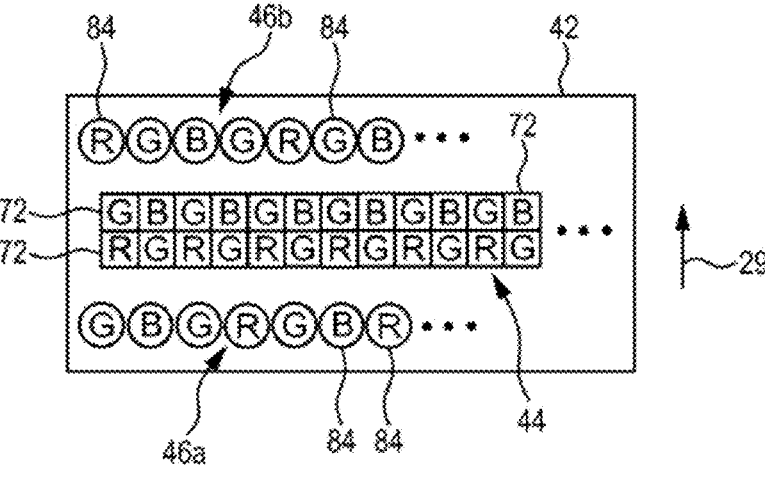
FIG. 6 shows a schematic illustration of an example arrangement of two line light sources and a multi-line scan camera for the inspection sensor of the device in accordance with FIG. 1.

FIG. 6 shows an example embodiment of the inspection sensor 42 in accordance with FIG. 5 comprising a line scan camera 44 embodied as a multi-line scan camera having a plurality of camera elements 72, the camera elements 72 of the multi-line scan camera 44 each being sensitive to one of a plurality of light colors. By way of example, the multi-line scan camera 44 can have camera elements 72 which are sensitive either to the light color green or to the light color red or to the light color blue. Accordingly, in this example embodiment, the line scan camera 44 is a color line scan camera, wherein the individual camera elements can form a Bayer pattern. The first line light source 46a and the second line light source 46b (cf. FIG. 5) can each have light elements 84, each of which dominantly emits a light color. By way of example, the line light sources 46a, 46b can thus include light elements 84 which dominantly emit either red or green or blue light. With such an inspection sensor, the defined material layer 18 can be illuminated simultaneously from different directions, wherein the angle-selective illumination can be differentiated from one another on the basis of the light colors.

In some example embodiments, it is possible to use an inspection sensor in accordance with FIGS. 5 and 6 with an angle-selective illumination in an arrangement in accordance with FIG. 2 and/or FIG. 4. In further example embodiments, the line scan camera 44 and/or the line light sources 46a, 46b in accordance with FIGS. 5 and 6 can have camera elements 72 and/or light elements 84 which dominantly record and/or emit light in the infrared range. Accordingly, the variants illustrated here with reference to FIGS. 2 to 6 can be wholly or partly combined with one another.

The function of the novel device in accordance with an example embodiment is explained below with reference to FIGS. 7 and 8. In accordance with step 100, a data set 38 defining the workpiece 14 in a plurality of workpiece layers 16 arranged one on top of another is read into the evaluation and control unit 34. In accordance with step 102, a material layer 18 is produced on the layer stack 24. By way of example, for this purpose, the evaluation and control unit 34 can take particulate material 20 from the reservoir 28 with the aid of the doctor blade 22 and can distribute it on the layer stack 24. The distribution of the particulate material 20 is usually intended to be uniform and as homogeneous as possible.

In accordance with step 104, the surface of the new material layer 18 is inspected with the aid of the inspection sensor 42 in order to recognize possible inhomogeneities such as waves, accumulations, doctor blade structures or density variations in the particulate material. If the surface of the new material layer 18 satisfies all desired criteria, in accordance with step 106 the method branches to step 108, in which a new workpiece layer 16 is produced in the topmost material layer 18 with the aid of the structuring tool 30. If the surface of the new material layer 18 does not satisfy the desired criteria, in accordance with loop 110 the method branches back to step 102 in order to rework the surface of the new material layer 18 or produce it completely anew. In accordance with step 114, the manufactured workpiece layer 16 can be inspected. In accordance with step 112, steps 102-114 are repeated until the workpiece 14 is completed according to the data set 38.

Figure 7:
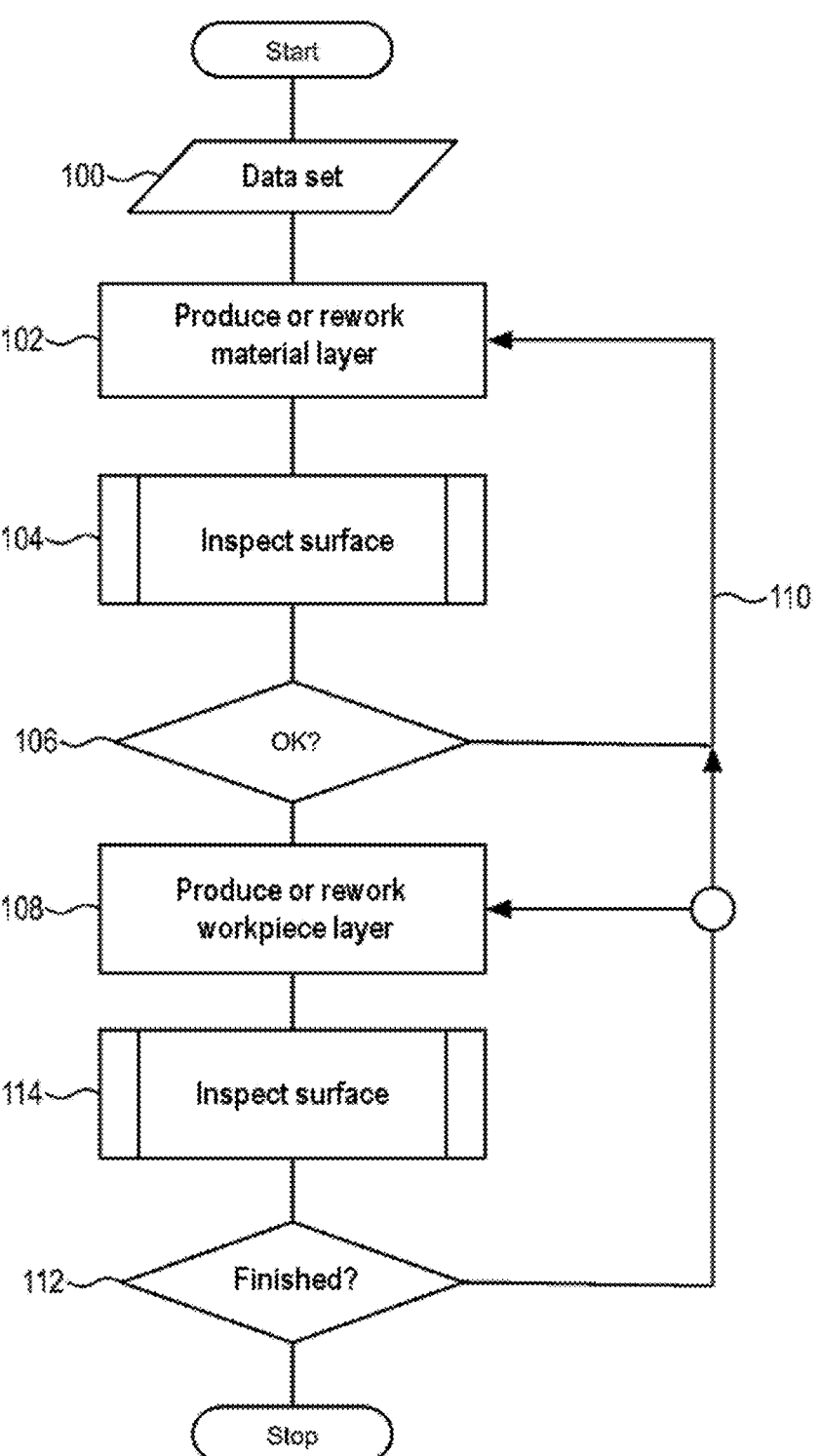
FIG. 7 shows a flowchart for explaining the mode of operation of an example embodiment of the novel device.
Figure 8:
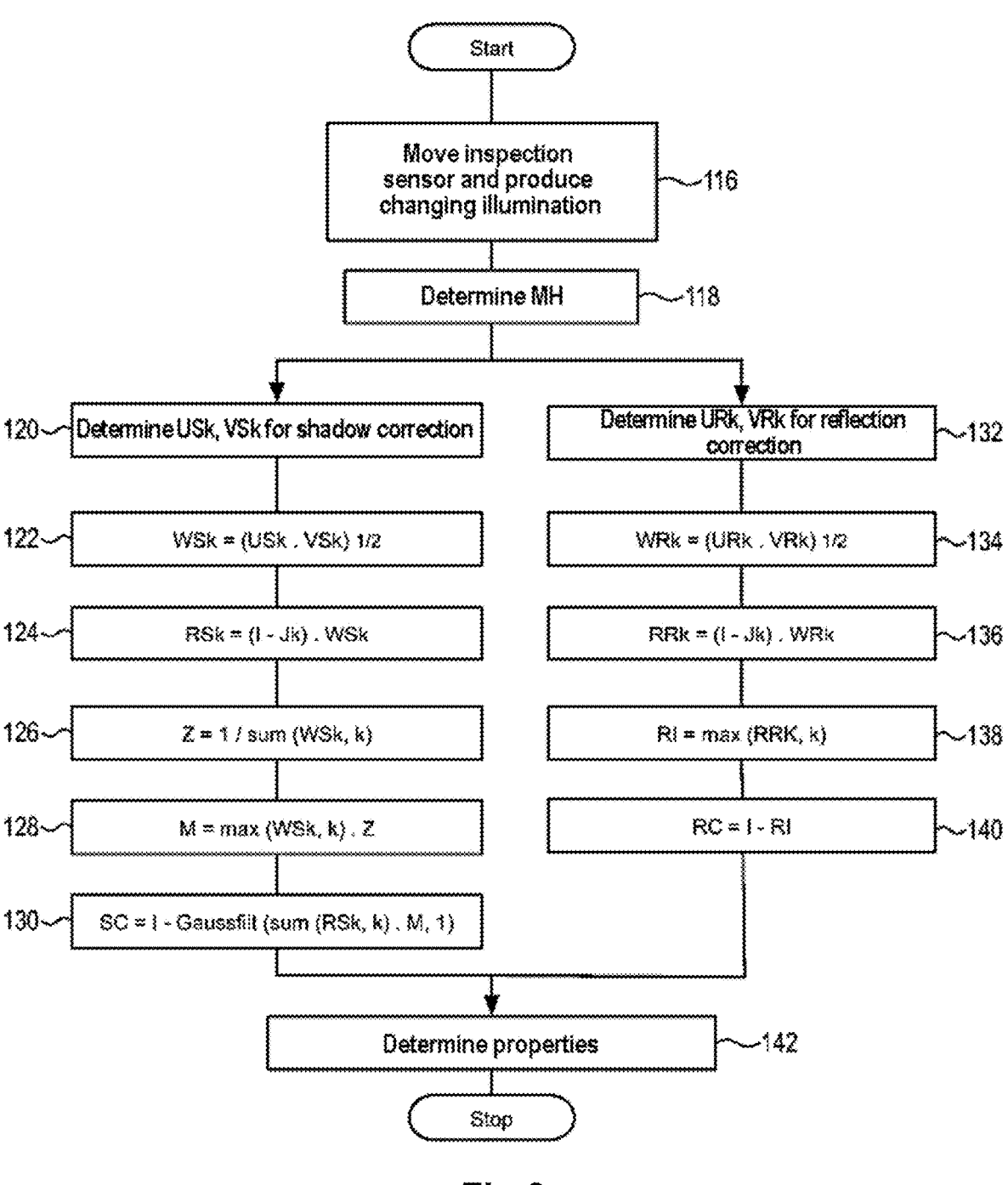
FIG. 8 shows a further flowchart for explaining the inspection of the material surface in accordance with an example embodiment of the novel device.

FIG. 8 shows one advantageous example embodiment of method step 104 from FIG. 7. In accordance with step 116, the inspection sensor 42 is moved relative to the production platform 12 and the object surface of the material layer 18 is illuminated from a plurality of different directions in the process, for example with the aid of the line light sources 46a, 46b in accordance with FIG. 6. Furthermore, a plurality of images of the object surface illuminated in each case are recorded in scanning fashion here with the aid of the multi-line scan camera 44. In various embodiments, at least three images are recorded, although a higher number may be advantageous. Accordingly, in some example embodiments, the line scan camera 44 can have 3 or more lines having camera elements in the movement direction. Hereinafter, a first image is designated by 1 and a further k images are designated by $J_k$, where the index k denotes the number of further images.

After all the images have been recorded, step 118 involves determining a maximum brightness value MH over all the pixel values of the recorded images. The maximum brightness value MH can be used later in the determination of an aggregate reflection image and/or else in the determination of a shadow-corrected image and/or a reflection-corrected image of the object surface in order to be able to consider the pixel values in the images as relative brightness values, for example between 0 and 1. In some example embodiments, step 118 can be omitted and the pixel values of the images can be used as absolute values.

A shadow-corrected image SC of the object surface is determined in accordance with steps 120 to 130, while an aggregate reflection image RI is determined in steps 132 to 138 and in addition a reflection-corrected image RC of the material layer 18 is also determined in step 140. Steps 120 to 130 and steps 132 to 140 are illustrated in parallel with one another in FIG. 8 and can be carried out in parallel with one another if the evaluation and control unit 34 enables a corresponding parallel processing. As an alternative thereto, steps 120 to 130 and steps 132 to 140 can be carried out successively and it is likewise possible to determine only an aggregate reflection image in accordance with steps 132-140 in order subsequently to determine individual properties of the material layer 18.

In accordance with step 120, a first indicator value $US_k$ and a second indicator value $VS_k$ are determined. Advantageously, the indicator value $US_k$ can be determined as follows:

$$US_k=1(I-J_k\leq0)\cdot1(J_k-I\leq MH\cdot0.1)\cdot(J_k-I)/0.1/MH+1(J_k-I>0.1\cdot MH).$$

where the function 1 ( . . . ) yields the value 1 if the condition specified between the parentheses is met, and yields the value 0 if the condition between the parentheses is not met. The indicator value $US_k$ is determined for all corresponding pixel pairs of the images I, $J_k$ which are intended to be evaluated in the determination of the shadow-corrected image SC, and has the value 1 if a considered pixel in an image $J_k$ is brighter than the corresponding pixel in the image I by more than 10%. In this case, the percentage value relates to the maximum brightness value MH and it forms a threshold value that defines a limit of a brightness value range.

The threshold value with the magnitude of 10% that is assumed here is by way of example and can be chosen to be smaller or larger in other example embodiments. For relative brightnesses of a considered pixel in the image $J_k$ between 0 and the assumed threshold value, a continuous transition is realized by means of the above formula. Broadly speaking, the indicator value $US_k$ with the value 1 signals when a considered pixel in an image $J_k$ is brighter than the corresponding pixel in the first image I, where the threshold value of 10% ensures that there is in each case a "distinct" difference in brightness between the image pixels considered.

The second indicator value $VS_k$ is advantageously calculated as follows:

$$VS_k=1(0.1\leq BL-J_k/MH)+1(0.1>BL-J_k/MH)\cdot1(J_k/MH\leq BL)\cdot(1+((BL-0.1)-J_k/MH)/0.1),$$

where BL (denoting Bright Limit) defines a further threshold value. The indicator value $VS_k$ has the value 1 if the considered pixel in the image $J_k$ has a relative brightness value of between at least 0 and a maximum value, which here is for example 10% of MH below the threshold value $BL\cdot MH$. Here, too, a continuous link is advantageously realized in the transition to the upper threshold value BL. Broadly speaking, the indicator value $VS_k$ assumes the value 1 if the pixel value of a considered pixel in an image $J_k$ is between 0 and the upper threshold value defined by BL.

In accordance with step 122, a combined indicator value $WS_k$ is determined in accordance with the following formula $$WS_K=(US_k\cdot VS_k)^{1/2}$$

from the indicator values mentioned above. The combined indicator value $WS_k$ prevents a considered pixel in an image $J_k$ from being included in the further calculation if it is too bright or too dark. The exponent 1/2 here represents a square root operation, which has been found to be advantageous for the inspection of a metal powder. In principle, however, the product can also remain without a further operation or be exponentiated with other exponents p<1. Furthermore, there may be applications in which exponents p>1 are better. Depending on whether the exponent p>1 is involved, a profile with values close to zero is smoothed, or, in the case of exponents p<1, a profile with values close to 1 is smoothed. An exponent p>0 is thus applicatively possible. An exponent $0<p\leq1$ is particularly advantageous.

In accordance with step 124, a difference $RS_k$ is then formed for all considered pixel pairs in the images I and $J_k$, this difference being weighted with the combined indicator value $WS_k$ in accordance with the following formula $$RS_k=(I-J_k)\cdot WS_k$$

The difference values $RS_k$ each form a correction vector for a pixel in the first image, which correction vector is weighted with the combined indicator value $WS_k$.

In various embodiments, the correction vectors $RS_k$ are averaged in order to determine a shadow-corrected image SC. For this reason, in step 126, a factor Z is determined in accordance with the following formula:

$$Z=1/sum(WS_k,k).$$

The correction vectors are advantageously averaged here with the aid of the sum of the combined indicator values $WS_k$. In accordance with step 128, a damping factor is advantageously determined in the form of the maximum combined indicator value over all combined indicator values $WS_k$, i.e.

$$M=max(WS_k,k)$$

In accordance with step 130, a shadow-corrected image is then determined in accordance with the following formula:

$$SC=I-Gaussfilt(sum(RSk,k)\cdot M,1).$$

In this case, the function Gaussfilt ( . . . , 1) denotes a Gaussian filter with a standard deviation, here assumed to be 1, for example. In principle, the value for the standard deviation could be chosen differently.

Accordingly, in step 130, a shadow-corrected image is determined by determining a difference between the pixel values in the first image I and corresponding pixel values in a weighted and filtered correction image. The correction image results here from the Gaussian-filtered sum of all correction vectors, where the correction vectors are in turn weighted with the combined indicator value $WS_k$. Some other local smoothing filter could also be used as an alternative to Gaussian filtering. The threshold value BL achieves the effect that the reflections in the images I, $J_k$ do not add up in an undesired manner in the determination of the shadow-corrected image SC. The filtering in the final step 130 avoids or reduces artificial artefacts. Abrupt changes in the summed correction are largely avoided by means of the multiplication of the summed correction vectors by the maximum of the combined indicator value.

The determination of an aggregate reflection image and—in some instances—a reflection-corrected image is carried out in a similar manner. Step 132 involves firstly calculating an indicator value $UR_k$ in accordance with the following formula:

$$URk=1(Jk-I\leq0)\cdot1(I-Jk\leq MH\cdot0.1)\cdot(I-Jk)/0.1/MH+1(I-Jk>0.1\cdot MH).$$

Accordingly, a considered pixel in the images $J_k$ influences the correction of the first image I if its brightness value is darker than the brightness value of the corresponding pixel in the first image I. Furthermore, step 134 involves calculating an indicator value $VR_k$ in accordance with the following formula:

$$VRk=1(Jk/MH>DL+0.1)+1(Jk/MH>DL)\cdot1(Jk/MH\leq DL+0.1)\cdot(Jk/MH-DL)/0.1.$$

The considered pixel in the images $J_k$ is intended to have a minimum brightness, which is set here by the threshold value DL (denoting Dark Limit).

In other words, a considered pixel in the images $J_k$ is intended to be in a second brightness value range, which, in accordance with step 134, is in turn defined with the aid of a combined indicator value $WR_k$. By way of example, the combined indicator value $WR_k$ is calculated in accordance with the following formula:

$$WRk=(URk\cdot VRk)^{1/2}$$

In accordance with step 136, the corresponding pixel values in the first image I and in the further images $J_k$ are subtracted from one another for all k and weighted with the combined indicator value $WR_k$. In other words, step 136 involves calculating correction vectors $RR_k$ in accordance with the following formula:

$$RR_k=(I-J_k)\cdot WR_k.$$

Step 138 then involves calculating an aggregate reflection image by determining the maximum of the correction vectors $RR_k$ over all k images:

$$RI=\max(RRk,k).$$

The aggregate reflection image is thus a substitute image calculated from the images I, $J_k$ and substantially showing the reflections at the surface of the material layer 18. This reflection image shows the spatial distribution of the light reflections at the material surface and is thus representative of the homogeneity of the distribution of the material particles.

In step 140, here advantageously a reflection-corrected image is also calculated according to the following formula:

$$RC=I-RI.$$

In other words, the reflection-corrected image is calculated by subtracting the pixel values of the aggregate reflection image from the pixel values of the first image I. Since the aggregate reflection image represents the reflections at the surface, the light reflections in the first image are largely eliminated by the subtraction. During the reflection correction, here—in contrast to the shadow correction—the maximum effect is advantageously used since reflections are typically locally limited and, in some instances, also greatly overmodulated. Alternatively, however, a Gaussian filter can be employed here in a manner corresponding to the case of shadow correction.

Step 142 involves determining individual properties of the material surface 18 such as height variations (for instance on account of doctor blade structures, waves, material accumulations or other unevennesses), individual particle sizes of the powder particles and/or the homogeneity of the distribution of the powder particles. By way of example, here it is possible to check whether the spatial distribution of the light reflections in the aggregate reflection image satisfies a defined uniformity criterion and/or whether the material surface 18 in the reflection-corrected and/or shadow-corrected image satisfies a defined criterion with regard to smoothness or possible height variations. If this is the case, a workpiece layer 16 is produced in accordance with step 108 (FIG. 7).

In principle, the inspection, in particular the determination of an aggregate reflection image and/or of a height map, can be carried out after the production of the workpiece layer, which is indicated at the reference numeral 114 in FIG. 7. Depending on the spatial distribution of light reflections at the workpiece layer produced, the workpiece can be reworked in order to correct possible defects, or the partly finished workpiece is rejected if it has defects which do not give reason to expect a successful correction, for economic and/or technical reasons.

As already indicated above, as an alternative or in addition to the method in accordance with FIG. 8, it is possible to carry out an inspection of the workpiece layer 16 with the aid of phase shifting deflectometry using the pattern generator 52, on the basis of a simple deflectometric examination of the workpiece surface using an inspection sensor in accordance with FIG. 2 and/or on the basis of a thermographic analysis of the workpiece surface. The phrase "at least one of A, B, and C" should be construed to mean a logical (A OR B OR C), using a non-exclusive logical OR, and should not be construed to mean "at least one of A, at least one of B, and at least one of C."

The invention claimed is:

1. A device for additive manufacturing of a workpiece, the device comprising:
   a production platform configured to support a defined material layer of particulate material;
   a structuring tool configured to selectively solidify particulate material of the defined material layer supported on the production platform in order to produce a defined workpiece layer;
   an inspection sensor configured to inspect a target layer that includes at least one of the defined material layer or the defined workpiece layer;
   an evaluation and control unit including an interface configured to obtain a data set defining the workpiece in a plurality of successive workpiece layers one on top of another; and
   a position encoder, wherein:
      the evaluation and control unit is configured to control the structuring tool depending on the data set in order to produce the plurality of successive workpiece layers one on top of another from the particulate material, the inspection sensor is movable along a movement direction relative to the production platform, the inspection sensor includes (i) a multi-line scan camera having a plurality of adjacent camera elements along the movement direction, and (ii) a line light source, the multi-line scan camera and the line light source each extend transversely with respect to the movement direction, the inspection sensor is coupled to the position encoder such that the position encoder generates a position signal representing a respective instantaneous position of the inspection sensor relative to the production platform, the evaluation and control unit is configured to generate a spatially resolved image of the target layer using the line light source, the multi-line scan camera, and the position signal, and the evaluation and control unit is configured to control the structuring tool depending on the spatially resolved image.

2. The device of claim 1 further comprising:

a layer forming tool configured to form the defined material layer of the particulate material on the production platform, wherein the layer forming tool is movable relative to the production platform along the movement direction.

3. The device of claim 2 wherein the inspection sensor is coupled to the layer forming tool.

4. The device of claim 2 wherein:

the layer forming tool includes a material outlet configured to selectively discharge particulate material, the multi-line scan camera is arranged upstream of the material outlet in the movement direction, the inspection sensor includes a second line scan camera, and the second line scan camera is arranged downstream of the material outlet in the movement direction.

5. The device of claim 1 wherein:

the line light source includes a plurality of light elements, and the evaluation and control unit is configured to selectively activate or deactivate the plurality of light elements so as to generate an illumination of the target layer from varying directions.

6. The device of claim 1 wherein:

the line light source is arranged upstream of the multi-line scan camera in the movement direction, the inspection sensor includes a second line light source, and the second line light source is arranged downstream of the multi-line scan camera in the movement direction.

7. The device of claim 1 wherein the line light source has a plurality of light elements producing a plurality of different light colors.

8. A device for additive manufacturing of a workpiece, the device comprising:

a production platform configured to support a defined material layer of particulate material;

a structuring tool configured to selectively solidify particulate material of the defined material layer supported on the production platform in order to produce a defined workpiece layer;

an inspection sensor configured to inspect a target layer that includes at least one of the defined material layer or the defined workpiece layer;

an evaluation and control unit including an interface configured to obtain a data set defining the workpiece in a plurality of successive workpiece layers one on top of another; and a position encoder, wherein:

the evaluation and control unit is configured to control the structuring tool depending on the data set in order to produce the plurality of successive workpiece layers one on top of another from the particulate material, the inspection sensor is movable along a movement direction relative to the production platform, the inspection sensor includes a first line scan camera, a second line scan camera, and a line light source, the first line scan camera, the second line scan camera, and the line light source each extend transversely with respect to the movement direction, the inspection sensor is coupled to the position encoder such that the position encoder generates a position signal representing a respective instantaneous position of the inspection sensor relative to the production platform, the evaluation and control unit is configured to generate a spatially resolved image of the target layer using the line light source, the first line scan camera, the second line scan camera, and the position signal, the evaluation and control unit is configured to control the structuring tool depending on the spatially resolved image, the first line scan camera has a first optical axis running orthogonally with respect to the defined material layer, and the second line scan camera has a second optical axis running obliquely with respect to the defined material layer.

9. The device of claim 8 wherein the first line scan camera and the second line scan camera are arranged such that the first optical axis and the second optical axis intersect at the defined material layer.

10. The device of claim 8 wherein the first line scan camera is configured to generate a thermal line scan image of the target layer.

11. The device of claim 8 wherein the evaluation and control unit is configured to correlate with one another a first image captured by the first line scan camera and a second image captured by the second line scan camera.

12. The device of claim 1 wherein the line light source is oriented obliquely with respect to the target layer.

13. The device of claim 1 further comprising a light pattern generator arranged above the production platform and configured to generate a defined light pattern on the target layer.

14. The device of claim 1 wherein the evaluation and control unit is configured to synchronously record a plurality of spatially resolved images of the target layer using the plurality of adjacent camera elements in the movement direction and the position signal during a movement of the inspection sensor, thereby capturing transient signals in the target layer.

15. The device of claim 7 wherein:

the plurality of adjacent camera elements in the movement direction each are sensitive to one of the plurality of different light colors, and the evaluation and control unit is configured to differentiate an angle-selective illumination from the plurality of light elements based on the plurality of different light colors.

\* \* \* \* \*